June 28, 1966

D. H. REED ETAL 3,258,593

CHLORINE LOGGING APPARATUS WITH TEMPERATURE
COMPENSATION CIRCUIT

Filed July 12, 1962

*INVENTORS*
Dale H. Reed
Robert E. M<sup>c</sup>Callum
William C. Pritchett

BY

*Charles F. Steininger*

INVENTORS
Dale H. Reed
Robert E. McCallum
William C. Pritchett

BY

Charles F. Steininger

3,258,593
CHLORINE LOGGING APPARATUS WITH TEMPERATURE COMPENSATION CIRCUIT
Dale H. Reed, Robert E. McCallum, and William C. Pritchett, Dallas, Tex., assignors to The Atlantic Refining Company, Philadelphia, Pa., a corporation of Pennsylvania
Filed July 12, 1962, Ser. No. 209,385
4 Claims. (Cl. 250—71.5)

The present invention relates to an improved gain stabilization system for a chlorine logging apparatus. More specifically, the present invention relates to an improved system of circuits that cooperate to reduce the effect of temperature variations on a chlorine logging apparatus.

Basically, the chlorine log is produced by bombarding a subsurface formation with fast neutrons and measuring the response of the formation in terms of prompt gamma rays of capture in a given energy range. Formation fluids, well bore fluids and certain elements in the formation moderate the fast neutrons until they reach thermal energy. At this energy, the neutrons are subject to capture by various atoms making up the formation. As a result of such captures, gamma rays are emitted and their energies are characteristic of formation elements performing the captures. Therefore, since chlorine is a principal capturer because of its large thermal neutron capture cross section, chlorine content of a formation can be determined by logging the count rate of gamma rays with energies characteristic of chlorine. In like manner, hydrogen content is indicated by the count rate of gamma rays with energies above a predetermined value and this measurement has acquired the name "neutron log" or "neutron curve" in the well logging art. The chlorine content, together with a conventional hydrogen content (neutron) curve, recorded separately or simultaneously, are conventionally referred to as a chlorine log. Since the hydrogen content or neutron curve is diagnostic of formation porosity and the chlorine curve is diagnostic of chlorine content, the log can be used to determine if porous formations contain salt water. That is, if the neutron curve registers a small gamma ray count in the energy range most affected by chlorine, then the formation apparently contains hydrogen (water or oil) but little salt. If the depth of the formation rules out the presence of fresh water, oil is indicated.

Present-day apparatus utilize various devices for stabilizing heat-sensitive electronic circuits during logging operations. Most of these devices concentrate on maintaining photomultiplier tubes and their associated circuitry at relatively constant temperatures during the logging operations by using ice jackets, endothermic reactions, etc., which operate to maintain the temperature below 100 degrees Fahrenheit during the logging operations. Other devices utilize various circuits for regulating voltages in an attempt to maintain stable operation as temperature increases. In spite of the numerous devices available today, no device is capable of satisfactorily meeting the unique requirements of a chlorine logging apparatus; that is, the need to maintain overall circuit gain stability throughout an initial large temperature change and the need to maintain a uniform operating temperature. Normally, logging apparatus are calibrated at uphole ambient temperatures of from 32 to 100 degrees Fahrenheit and are operated downhole at temperatures ranging up to 300 degrees Fahrenheit. Even with a properly working cooling device the photomultiplier tube and the associated circuitry operate downhole at approximately 100 degrees Fahrenheit. This large temperature change from uphole ambient to downhole operating temperature throws the instrument out of calibration and produces inaccurate logs. More specifically, the increase in temperature caused by resistive heating of electronic components in the sonde and elevated borehole temperature reduces the gain of the photomultiplier tube and increases the gain in the amplifier circuits. The decrease in gain causes the photomultiplier to identify a quantum of energy as a value less than its actual energy value. For example, a 2.25 m.e.v. gamma ray may be falsely identified as a gamma ray less than 2 m.e.v. In the case of the amplifiers in the pulse height analyzer circuit, the rise in temperature increases the gain of the amplifiers and, in effect, changes the threshold voltages in the pulse height analyzer. Although the gain changes in the photomultiplier and the amplifiers are in opposite directions they are not offsetting and the total logging error varies according to the particular photomultiplier tube used.

Accordingly, it is an object of the present invention to provide an improved gain stabilizing system for a chlorine logging apparatus.

Another object of the present invention is to provide a system for reducing the effects of temperature variations on a chlorine logging apparatus.

Another object of the present invention is to provide a means for improving the temperature stability of photomultiplier gain over a temperature range of from uphole ambient to downhole operating temperature.

Another object of the present invention is to provide an improved cooling means for maintaining the photomultiplier tube in a pulse height analyzing circuit at approximately 97 degrees Fahrenheit during logging operations.

Another object of the present invention is to provide means for stabilizing the gain of neutron and chlorine signal amplifiers.

Another object of the present invention is to provide an automatic temperature compensating system for a chlorine logging apparatus that maintains the electronics at a fairly stable operating temperature and provides for automatic adjustment of voltages to compensate gain during a large initial temperature change and for later occuring small temperature changes.

Other objects and advantages of this invention will become apparent from the following description taken in connection with the accompanying drawings, wherein.

Briefly described, the invention is an improved means for stabilizing the gain of the photomultiplier tube and the signal amplifiers in the pulse height analyzer over large initial temperature variations and over later occurring small temperature changes. The invention further includes an improved means for maintaining the photomultiplier tube and its associated circuitry at a relatively stable, elevated temperature of 97 degrees Fahrenheit after the sonde has been lowered into the borehole.

The invention as described is highly suited for use with the chlorine logging system described in copending application, Serial No. 183,960, now abandoned, owned by a common assignee, but can be used with any chlorine logging system using a pulse height analyzer.

Figure 1:
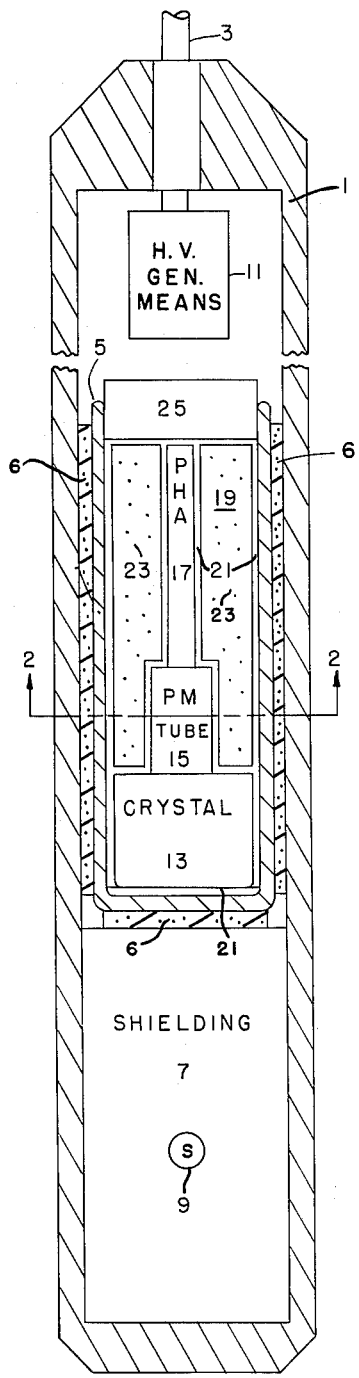
FIGURE 1 is a cross sectional view of the longitudinal axis of the sonde. For purposes of clarity, the majority of the sonde's interior components are shown in block form.

Refer now to FIGURE 1 showing the relative position of components in the downhole tool or sonde. The sonde includes case 1 supported by cable 3. The case houses vacuum bottle 5, shielding 7, radioactive source 9 and high voltage generator means 11. Bottle 5 protected by cushion 6 includes crystal 13, photomultiplier tube 15, pulse height analyzer 17, cooling system 19 containing can 21 and coolant 23, and stopper 25. As will be described in detail hereinafter, certain improvements in downhole components 15 and 17 combine with 19 to develop an improved means for maintaining constant gain regardless of temperature variation.

Figure 2:
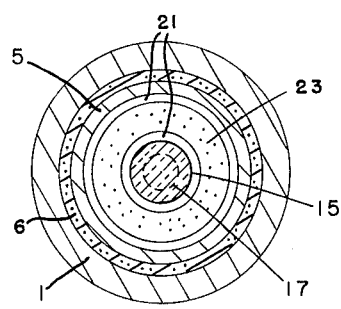
FIGURE 2 is a cross sectional view of the transverse axis of the sonde taken along 2–2' of FIGURE 1.

FIGURE 2 further serves to illustrate the construction features of case 1, cushion 6, bottle 5, can 21, coolant 23, photomultiplier tube 15, and pulse height analyzer 17.

Figure 3:
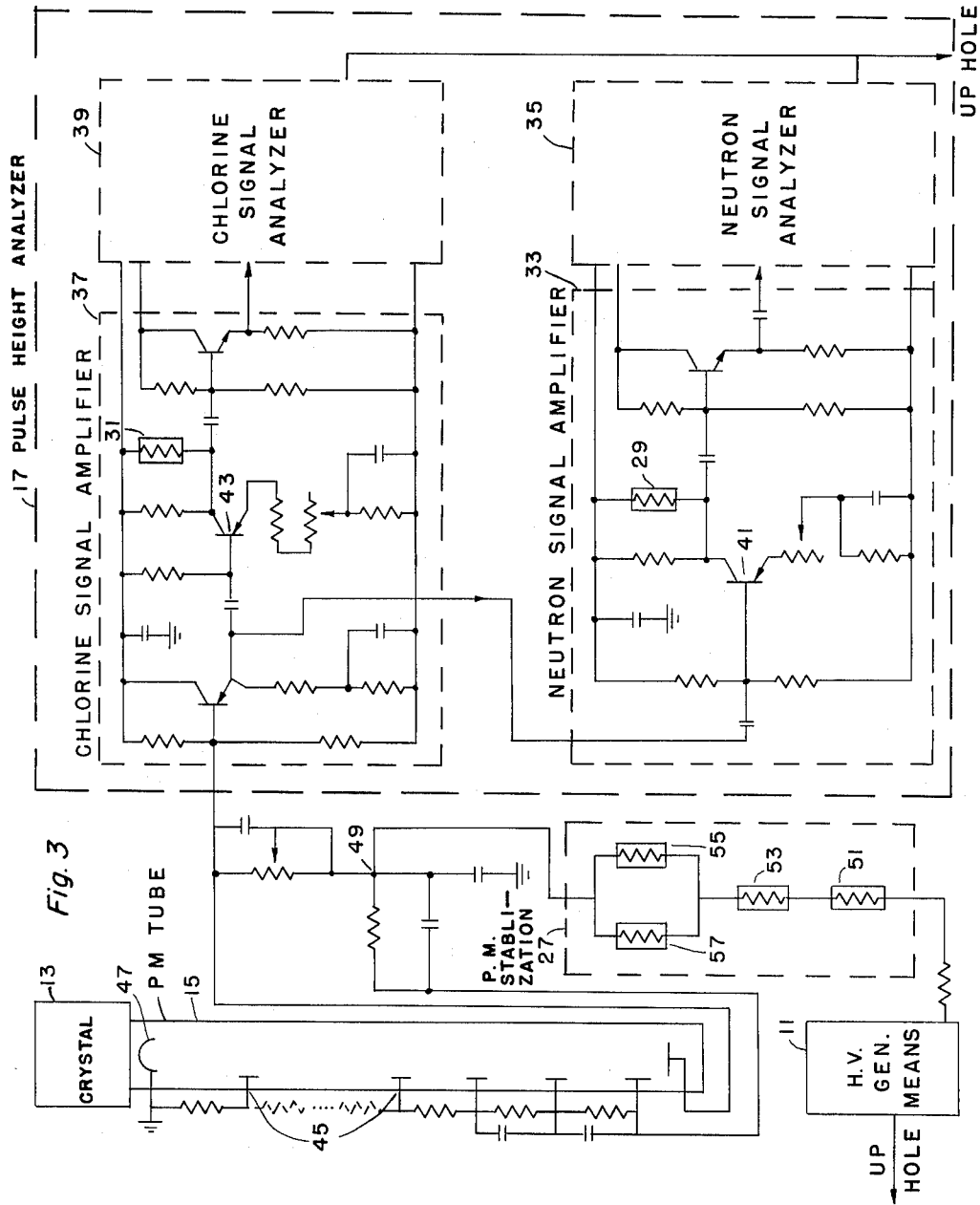
FIGURE 3 is a diaphragm, partially in block form, of the photomultiplier tube and the pulse height analyzer.

For a detailed description of the improvements in photomultiplier tube 15 and pulse height analyzer 17 refer now to FIGURE 3. Generic components shown in FIGURE 1 are similarly numbered in FIGURE 3. The improved means for regulating photomultiplier gain is shown as block 27. Although block 27 is shown connected between tube 15 and high voltage generator means 11, it is actually physically located within tube block 15, FIGURE 1. The improved means for controlling gain in the pulse height analyzer 17 includes thermistors 29 and 31, respectively. As illustrated in FIGURE 3, 17 includes neutron signal amplifier 33 connected to neutron signal analyzer 35 and chlorine signal amplifier 37 connected to chlorine signal analyzer 39. Thermistor 29 is shown connected to the collector of transistor 41 in 33. Thermistor 31 is shown connected to the collector of transistor 43 in 37.

In operation, chlorine signal amplifier 37 receives voltage pulses from the photomultiplier tube 15 and passes these pulses representing various prompt gamma ray energies to chlorine signal analyzer or discriminator 39. Chlorine signal analyzer 39 selectively detects pulses representing high energy gamma (chlorine) signals or "discriminates" against those not representative of chlorine. Neutron signal amplifier 33 receives pulses from the first stage of amplifier 37 and connects to neutron signal analyzer or discriminator 35 which selectively detects low energy gamma signals above a predetermined level or "discriminates" against those below that level. By way of example, reference is made to the preferred pulse height analyzing circuit for use with the apparatus of the present invention which circuit is fully described in application Serial No. 183,960, owned by a common assignee. Therein, a portion of a prompt capture gamma ray spectrum sensitive to chlorine and a portion of the spectrum dependent on hydrogen content are scanned simultaneously. The chlorine analyzer system passes all signals representing energy between 5.0 and 6.5 million electron volts and the neutron signal analyzer passes all signals representing energy above 2.0 million electron volts. The output pulses from the signal analyzers are applied to the same transmission line and sent uphole and chlorine and neutron pulses are separated uphole on the basis of pulse magnitude or phase and appropriate chlorine and neutron curves are recorded therefrom.

Before conducting logging operations, the photomultiplier tube, the pulse height analyzer and associated circuitry are calibrated uphole by the method defined in copending application, Serial No. 183,960, owned by a common assignee. After calibration and as the internal temperature of the sonde increases from uphole ambient to operational temperature, the gain of the photomultiplier tube is held constant by the action of circuit 27 and amplifier gains in the pulse height analyzer are held stable by thermistors 29 and 31.

The purpose of photomultiplier stabilization circuit 27 is to compensate for the change in complex secondary emission characteristics of dynodes 45 and the light sensitivity and emission characteristics of photocathode 47 caused by variations in temperature. The total resistance of 27 is designed to decrease with temperature thereby increasing the high voltage at junction 49. This increase in high voltage tends to increase the gain at the photomultiplier tube. This increase in gain due to voltage change offsets the decrease in photomultiplier gain with temperature due to the changes in the emission characteristics discussed above.

Since each photomultiplier tube possesses its own individual gain-temperature characteristic curve, the parameters in each compensating circuit 27 may vary in size and configuration. It has been found that the characteristics of a compensating circuit for a particular photomultiplier tube can be determined by measuring the gain-temperature characteristics of the tube. Various values of thermistance and circuit configurations are then connected into the photomultiplier tube power supply circuit. The gain-temperature characteristics of the combination photomultiplier tube and each of the various compensating circuits are measured experimentally. The compensation circuit which, when used with the photomultiplier tube, gives the most stable gain-temperature characteristic is used. Empirical testing, as described above, is used due to the complex nature of gain change of the photomultiplier tube with slight variations in power supply voltage and temperature.

Compensating circuit 27 shown in FIGURE 3 was developed for the particular photomultiplier tube shown. Each of the thermistors 51, 53, 55 and 57 is rated at 100K.

Consider now neutron signal amplifier 33 in the pulse height analyzer circuit 17. It is well known that the gain of a transistor amplifier increases with temperature within certain limits. Since the gain of the amplifier was accurately set during calibration the rise from calibration to operating temperature produces a significant increase in amplifier gain. To compensate for this increase, thermistor 29 is placed in the collector circuit of transistor 41. Therefore, as the temperature increases, the collector load (resistance of 29) decreases causing an effective decrease in gain thereby offsetting the increase in gain of transistor 41. The action of thermistor 31 in chlorine signal amplifier 37 is the same as the described action of thermistor 29. It should be noted at this point, however, that the gain is much more critical in the neutron signal amplifier than in the chlorine signal amplifier since a greater amplification factor is required in the neutron amplifier. Greater amplification is required since lower energy gamma rays are included in the neutron curve than in the chlorine curve.

Refer now to the improved cooling system shown as 19 in FIGURE 1. Hollow cylindrical steel can 21 is lined with a corrosion-resistant paint and is designed to encircle pulse height analyzer circuit 17 and photomultiplier tube 15 and to fit adjacent to crystal 13 as shown. Can 21 is filled with coolant 23 which is sodium phosphate dodecahydrate ($Na_2HPO_4 \cdot 12H_2O$). The heat of fusion of this coolant is 101.5 cal./cc. and its melting point is 97 degrees Fahrenheit. These characteristics combine with the fact that it contains no elements that interfere significantly with chlorine logging operations to make it a highly desirable coolant. The use of the unique can configuration which affords maximum coolant capacity and maximum exposure to 15 and 17 combines with the coolant to produce an improved system capable of maintaining the photomultiplier tube and the pulse height analyzer at 97 degrees Fahrenheit under most conditions encountered in chlorine logging operations.

It is to be observed that, although specific embodiments of the instant invention have been illustrated and described herein various modifications and substitutions may be made, which will be obvious to those skilled in the art, without departing from the scope of the present invention which is limited only by the appended claims.

We claim:

1. A radioactive logging system for detecting radiation in a well bore and converting the detected radiation to electrical signals for transmission to the surface of the earth including
    (a) a scintillator responsive to radiation,
    (b) a photomultiplier positioned adjacent said scintillator and adapted to convert scintillations to electrical pulses,
    (c) a high voltage generator means connected to said photomultiplier to supply power to said photomultiplier, (d) a temperature responsive gain stabilization circuit connected to said photomultiplier and said voltage generator means to vary the power to said photomultiplier in response to temperature variations, and
(e) a pulse height analyzer circuit connected to the output of said photomultiplier to selectively pass electrical pulses representative of at least one preselected energy range of radiation wherein said analyzer includes two parallel electrical circuits of which the first circuit is adapted to pass pulses representative of radiation above a preselected low energy level and the second circuit is adapted to pass pulses representative of radiation within a narrow band of energy above that passed by the first circuit, each of said circuits including an amplifier connected to the output of the photomultiplier, a discriminator connected to the output of said amplifier, and a temperature responsive gain stabilization element connected to at least one of said amplifiers to compensate for changes in the gain of the amplifier with changes in temperature.

2. A system in accordance with claim 1 wherein the temperature responsive gain stabilization element for the pulse height analyzer circuit is a thermistor.

3. A system in accordance with claim 1 wherein the temperature responsive gain stabilization element for the pulse height analyzer circuit is connected to the amplifier in the first circuit in said pulse height analyzer circuit.

4. A system in accordance with claim 1 wherein the first electrical circuit in the pulse height analyzer circuit includes a transistor and a thermistor connected to the collector of said transistor in a manner to temperature compensate said first electrical circuit.

References Cited by the Examiner
UNITED STATES PATENTS

| | | | |
|---|---|---|---|
| 2,758,217 | 8/1956 | Scherbatskoy | 250—71.5 |
| 3,038,074 | 6/1962 | Scherbatskoy | 250—83.6 |
| 3,090,867 | 5/1963 | Swanson | 250—83.6 |

RALPH G. NILSON, *Primary Examiner.*

J. W. LAWRENCE, *Examiner.*